United States Patent [19]
Allen

[11] Patent Number: 4,678,370
[45] Date of Patent: Jul. 7, 1987

[54] SEWER RENOVATION SYSTEM

[75] Inventor: Peter Allen, Queensland, Australia

[73] Assignee: Danby Pty. Ltd., Queensland, Australia

[21] Appl. No.: 788,019

[22] Filed: Oct. 16, 1985

[30] Foreign Application Priority Data

Dec. 4, 1984 [AU] Australia .............................. PG8408
May 16, 1985 [AU] Australia ............................. 42585/85

[51] Int. Cl.$^4$ ........................... F16L 1/00; F16L 9/16; F16L 55/18
[52] U.S. Cl. .................................... 405/154; 405/156; 138/97; 138/154
[58] Field of Search ............... 405/132, 146, 150, 154, 405/155, 156, 184; 138/91, 97, 105, 129, 140, 141, 144, 147, 149, 150, 154, 175; 29/234, 235

[56] References Cited

U.S. PATENT DOCUMENTS

| | | | |
|---|---|---|---|
| 2,816,323 | 12/1957 | Munger | 405/155 X |
| 3,123,101 | 3/1964 | Blount et al. | 138/97 |
| 3,132,416 | 5/1964 | Hait | 405/156 X |
| 3,422,631 | 1/1969 | Silverman | 405/155 |
| 3,602,263 | 8/1971 | Bremner | 138/97 |
| 3,972,200 | 8/1976 | Scarpi | 405/150 X |
| 4,209,043 | 6/1980 | Menzel | 138/129 X |
| 4,566,496 | 1/1986 | Menzel et al. | 138/154 |

FOREIGN PATENT DOCUMENTS

| | | |
|---|---|---|
| 0081983 | 8/1983 | European Pat. Off. . |
| 2403044 | 7/1974 | Fed. Rep. of Germany ........ 138/97 |
| 2317041 | 10/1974 | Fed. Rep. of Germany . |
| 115192 | 9/1975 | German Democratic Rep. . |
| 122129 | 9/1976 | German Democratic Rep. . |
| 146982 | 3/1981 | German Democratic Rep. . |
| 2079805 | 1/1982 | United Kingdom . |
| 785432 | 12/1980 | U.S.S.R. .............................. 405/156 |

OTHER PUBLICATIONS

Spirex Systems, Case History Report No. 83/9, Oct. 1983.
Brochure of Hoechst Aktiengesellschaft, "Hoechst Plastics Pipes," pp. 82-87, Apr. 1980.
Sewerage Rehabilitation Manual, vol. III, Water Research Centre, 1983, pp. III/26-III/28.
Water Supply and Sewerage, 5th Ed., E. W. Steel and Terence J. McGee, pp. 423-425.
"Sewer Renovation-Post Conference Papers", Standing Committee on Sewer Systems, Sydney, Australia, Sep. 20-23, 1983 (pp. 67 and 76).
"Sewer Renovation", Second Workshop, Standing Committee on Sewer Systems, (prepared prior to workshop of Sep. 20-23, 1983), pp. 1-8.

Primary Examiner—Cornelius J. Husar
Assistant Examiner—Nancy J. Stodola
Attorney, Agent, or Firm—Schwartz, Jeffery, Schwaab, Mack, Blumenthal & Evans

[57] ABSTRACT

A method for lining a sewer pipe incorporate the steps of continuously forming a liner of helically wound strip, the strip having complementary engaging side formations, and feeding the liner into the sewer pipe. The ends of the liner are sealed to the sewer pipe and cementitious grout is pumped under pressure into the space between the liner and the sewer pipe to bond the liner is position.

3 Claims, 5 Drawing Figures

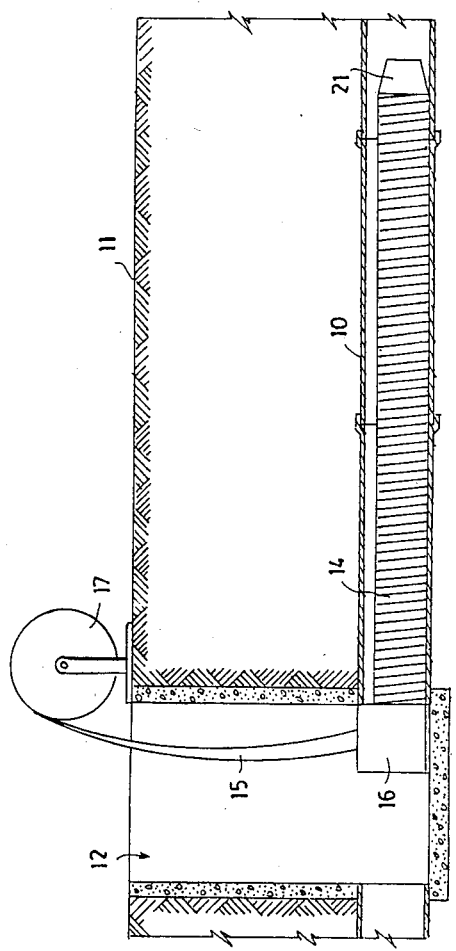
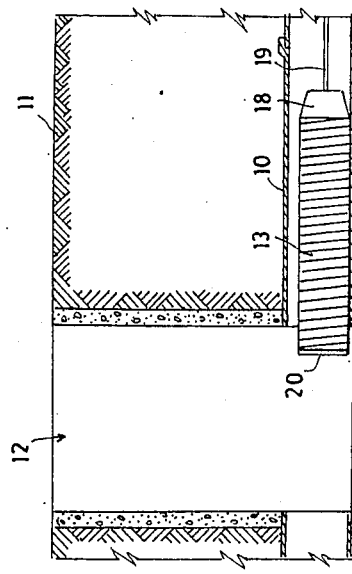
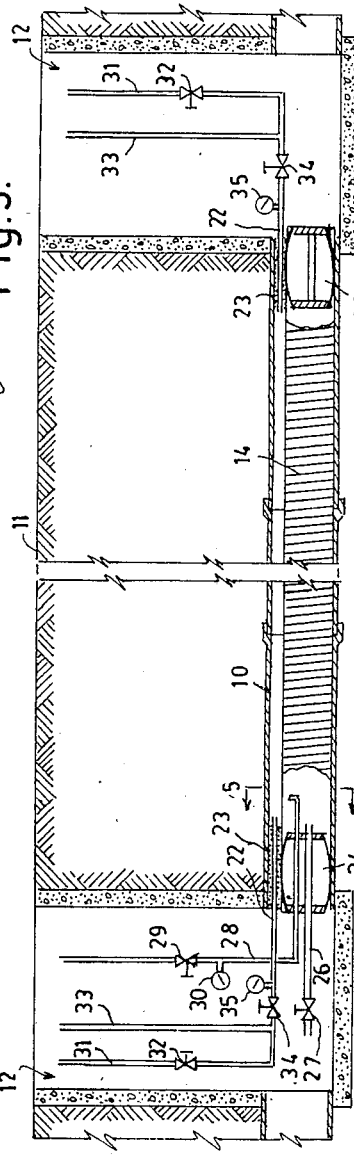
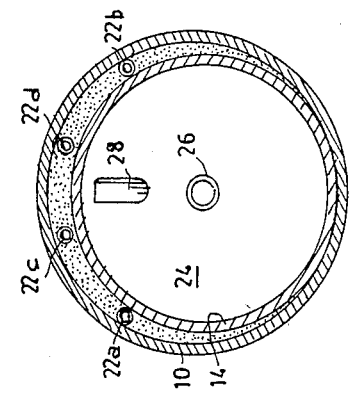

SEWER RENOVATION SYSTEM

BACKGROUND OF THE INVENTION (1) Field of the Invention

This invention relates to a sewer renovation system.

(2) Prior Art

Sewers can become damaged and sometimes blocked due to a number of causes, including earth movement, slime growth, tree root intrusion and pipe erosion due to hydrogen sulphide attacking the material of the sewer pipes.

The cost of digging up and replacing sewers is extremely high and various methods have been proposed for renovating existing but damaged sewer lines. According to one method presently used an inflatable tube is installed in the damaged sewer and, after it has been inflated, grout is pumped into the sewer pipe about the tube, which is removed after the grout has set. This method is very expensive and not fully reliable as the inflatable tube may be caused to collapse partially when the grout is pumped in, so that expensive and laborious correction work then becomes necessary.

SUMMARY OF THE PRESENT INVENTION

The present invention has been devised with the general object of providing an efficient but relatively simple and inexpensive method of relining a sewer pipe.

With this and other objects in view, the invention resides broadly in a method of lining a sewer pipe including the steps of:

continuously forming a liner of helically wound and interengaging strip and feeding it into a sewer to be lined;

sealing the end portions of the liner to the sewer pipe; and pumping a cementitious grout under pressure into the space between the liner and the sewer pipe.

Preferably before the grout is pumped into the space between the liner and the sewer pipe the liner is pressurised by plugging its ends and introducing fluid thereinto under pressure.

Other features of the invention will become apparent from the following description.

BRIEF DESCRIPTION OF THE DRAWINGS

In order that a preferred embodiment of the invention may be readily understood and carried into practical effect, reference is now made to the accompanying drawings, wherein:

FIG. 1 is a diagrammatic sectional view showing the manner of proving a sewer pipe before renovation commences, FIG. 2 is a diagrammatic sectional view showing the formation and insertion of a liner for the sewer, FIG. 3 is a sectional view, to larger scale, of part of the interlocking strip of which the liner is formed, FIG. 4 is a diagrammatic sectional and partly brokenaway view of a section of sewer in which the liner has been installed, sealed about its ends and plugged at both ends for pressurizing, and FIG. 5 is a cross-sectional view along line 5—5 in FIG. 4 to increased scale, and showing the lined sewer pipe after injection of grout.

DETAILED DESCRIPTION OF THE PREFERRED EMBODIMENT

The sewer pipe 10 to be renovated is laid under the ground, indicated at 11, and is accessible at intervals by manholes 12, each normally closed by a cover plate (not shown). Before renovation, the sewer is normally cleaned by conventional means, and is proved by drawing through it a proving section shown in FIG. 1 at 13. Subsequently a liner 14 is formed and fed through the sewer pipe 10.

Both the proving section 13 and the liner 14 are formed principally of a strip sold under the registered trade mark RIB LOC and shown in section at 15 in FIG. 3, the strip being formed with a number of T-section longitudinal ribs and shaped at its side edges for interlocking engagement of one side edge of a section of the strip with the opposite side edge of an adjacent section of the strip. By means of a winding head machine of known type, indicated at 16 in FIG. 2, the strip 15 can be drawn from a roll 17 and wound to a helix of predetermined diameter, the convolutions of the helix interlocking one with the next as shown in FIG. 3, the form a cylindrical tubular body. A solvent cement can be injected into the interlocking edge portions of the convolutions during the winding process for increased mechanical strength and water-tightness.

The proving section 13 is made at any convenient location by winding a fairly short cylindrical tubular section in this manner and applying to its leading end a nose cone 18. The proving section is brought into a man hole 12 and is drawn through the sewer pipe 10 by means of a cable 19, which may be passed through the nose cone 18 and tubular section and made fast to a base 20 applied to the trailing end of the section. If the proving section should jam in the pipe 10, it may be removed and a proving section of reduced diameter may be used to determine the required diameter of the liner 14 to be made and installed.

The required diameter of the liner having been determined, the winding head 16 is installed in a manhole, as shown in FIG. 2, and can be operated to draw the strip 15 from the roll 17 which is located conveniently above ground level. After a short length of the tubular line 14 has been formed by the winding head 16, a nose cone 21 is fitted and secured and the nose cone and formed part of the liner are inserted in the upstream end of the pipe 10. The winding head machine 16 is then operated to form continuously the liner 14 which is progressively passed through the pipe 10 until it enters a second manhole 12. The formed liner 14 is then severed so that the winding head 16 may be removed from the manhole. Four grout inlet pipes, indicated at 22a, 22b, 22c and 22d in FIG. 5, are inserted between the upper part of the liner 14 at both ends, and the sewer pipe 10, and the ends of the liner 14 are sealed to the pipe 10 by a rapid-setting cement fondue 23 (FIG. 4) introduced to the pipe ends 10 about the liner 14 and about the grout inlet pipes. The ends of the liner are closed by inflatable plugs 24 and 25. Each of these plugs consists of a resiliently flexible tubular section sealed at its ends about two end discs through the outer one of which water or air may be introduced under pressure to expand the resilient tubular section into firm sealing contact with the interior of the liner.

Water is then fed under pressure to the interior of the closed liner by way of a water inlet pipe 26 through the inflatable plug 24 and connected through a valve 27 to any suitable source of water under pressure. Air displaced by the water escapes through an air pipe 28 leading from the upper part of the liner through the plug 24 and by way of a valve 29 to atmosphere, a pressure gauge 30 being connected to the pipe 28. When the liner has been completely filled, water will escape through the air pipe 28, whereupon the valve 29 is closed and, when the water pressure has reached the desired level, for example about 100 kPa, the water valve 27 is closed.

Grout is then introduced under pressure to the space between the liner 14 and the pipe 10 by way of the grout inlet pipes 22a, 22b, 22c and 22d. The grout may be a constantly agitated mixture of cement, fly ash and water with added plasticizer. The grout is fed into the pipe 10 from both ends, by way of a grout feed pipe 31, in or to which are connected a gate valve 32, and overflow pipe 33, a ball valve 34 and a pressure gauge 35. Grout is fed from each grout pipe 22 in turn to the two lower grout inlet pipes 22a and 22b, displaced air escaping through the upper grout inlet pipes 22c and 22d. The pipes 22a and 22b are then plugged and introduction of grout is continued by way of one of the upper grout inlet pipes 22c and 22d, air escaping from the other. When grout flows from the remaining open grout inlet pipe, the feed of grout is prevented by closing the valves 34 and 32. During the introduction of grout, its pressure can be monitored at the gauges 35. When the predetermined pressure is reached, grout can be quickly bypassed through the pipe 33 by closing the valve 34.

The grout inlet pipes 22a, 22b, 22c and 22d are of course plugged as soon as their function is completed.

After some time, normally an hour or more, the plugs 24 and 25 are removed and the liner is inspected.

In long sewer sections, the length of the RIB LOC strip may not be sufficient to form the full length of liner between successive manholes, in which case strip from a supplementary roll is added, the two lots of strip being butt-jointed after cutting their ends with a 45° miter and lap-splicing the ends with fast-setting adhesive. The liner is wound past the joint and sealed with a rapid setting sealant applied both internally and externally to the joint.

As the reinforcing ribs about the liner 14 will key into the grout pumped into the cavity about it, the liner will be firmly locked in position, the internal water pressure of the liner during grouting preventing the liner from collapsing during grouting.

In man-entry sewers, the sections between manholes will preferably be lined section by section, tubular liner sections with square-cut ends being winched into position and butt-jointed internally, a joining section being placed in the joint and fixed with solvent cement.

Sewer renovation according to the method set out will be found to be very effective in achieving the objects for which the invention has been devised. It will, of course, be understood that this particular embodiment may be subject to many modifications which will be readily apparent to persons skilled in the art without departing from the scope and ambit of the invention hereinafter claimed.

I claim:

1. A method of lining a sewer pipe including the steps of:
   continuously forming a liner of helically wound and inter-engaging strip and feeding it into a sewer to be lined;
   sealing the end portions of the thus formed liner to the sewer pipe;
   setting removable plugs into the ends of the liner;
   pressurizing the liner by introducing fluid thereinto under pressure, said plugs retaining such fluid in said liner;
   pumping a cementitious grout under pressure into the space between the liner and the pipe, the grout being introduced initially by inlet pipes to a lower part of the space while permitting displaced air to be removed from the upper part of the space, and being subsequently introduced by further inlet pipes to the upper part of the space to totally fill the space; and
   removing the plugs from the ends of the liner after the grout has set.

2. The method as claimed in claim 1, wherein air is vented from the space by the further inlet pipes as the grout is introduced into the lower part of the space by the first mentioned inlet pipes.

3. The method as claimed in claim 1, wherein the strip is of a plastics material with longitudinal ribs located externally of the wound liner, said strip being formed with side edge portions constructed such that the edge portions of adjacent convolutions of the helically wound strip interlock, and sealing adjacently disposed side edge portions by introducing bonding material to the helical interlocking side portions during the winding of the liner.

* * * * *